April 16, 1957  L. PIGO ET AL  2,789,203
METHOD AND MACHINE FOR MAKING CELLULAR CORE
Filed Oct. 10, 1955  3 Sheets-Sheet 1

INVENTORS.
L. PIGO
R. W. STOLL
BY
S. Tierney, Jr
ATTORNEY

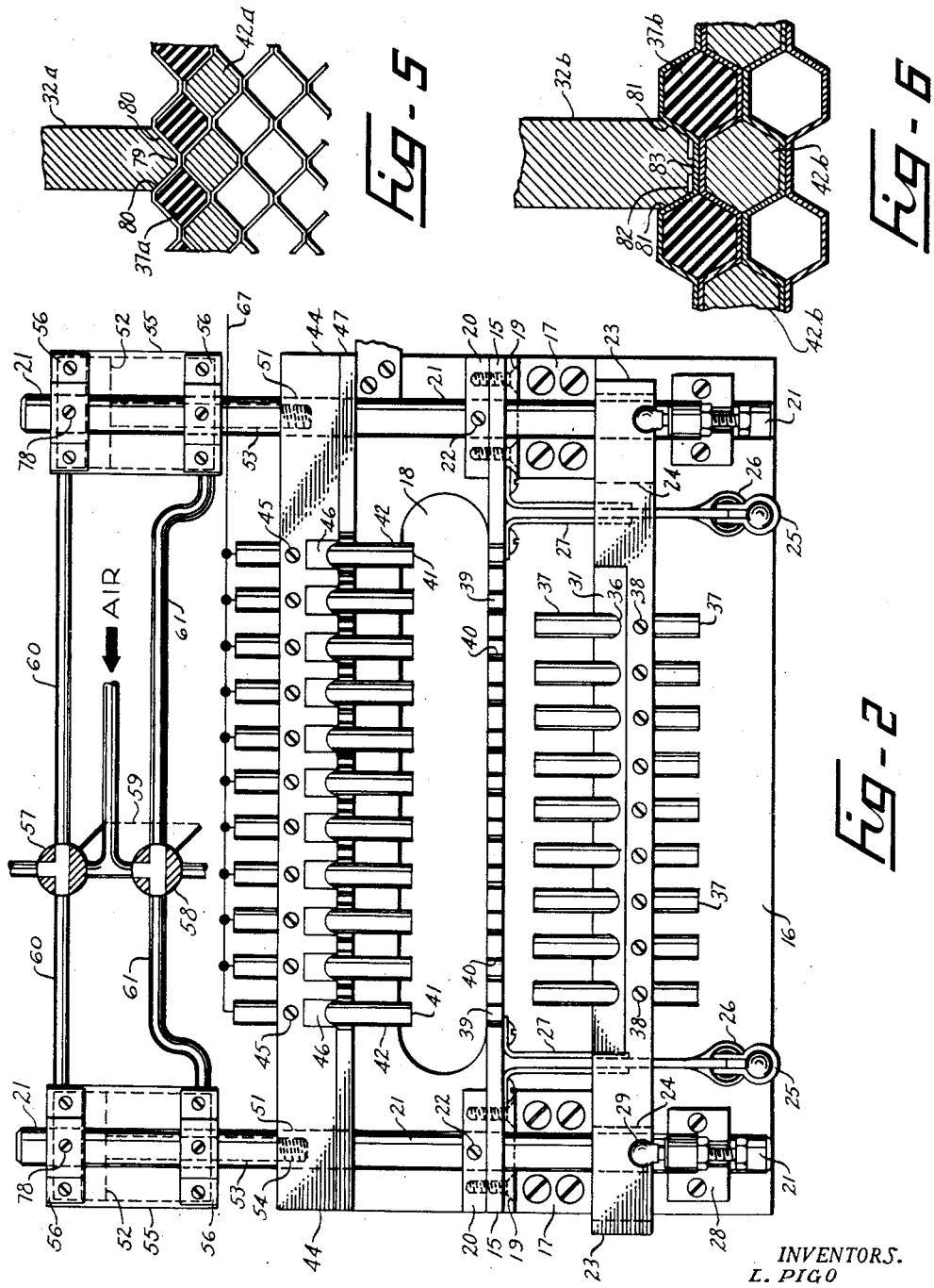

April 16, 1957  L. PIGO ET AL  2,789,203
METHOD AND MACHINE FOR MAKING CELLULAR CORE
Filed Oct. 10, 1955  3 Sheets-Sheet 3
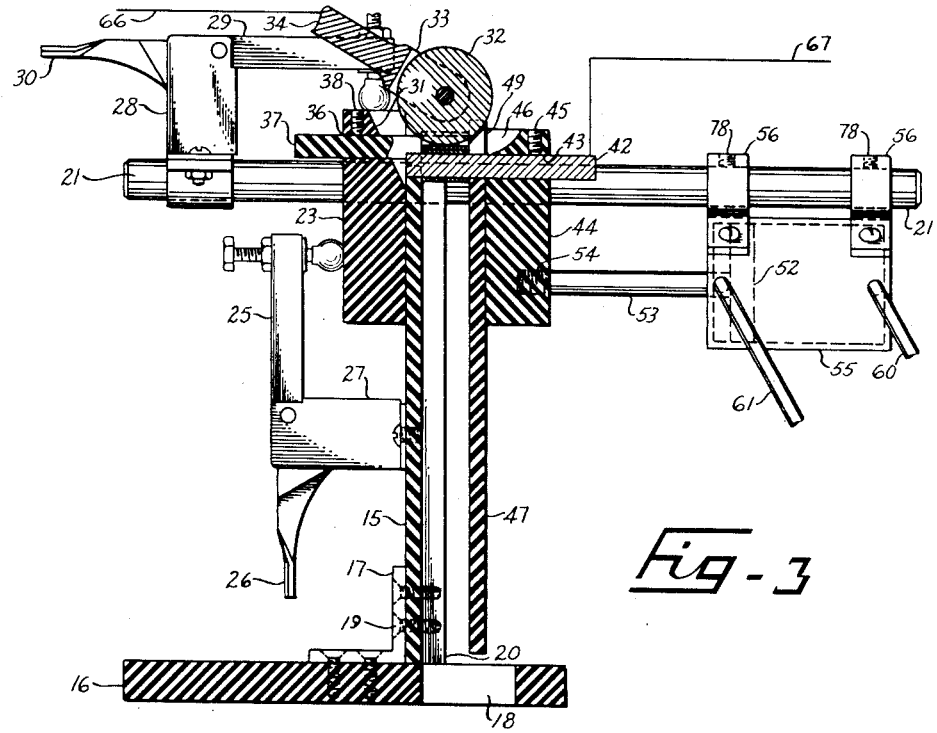
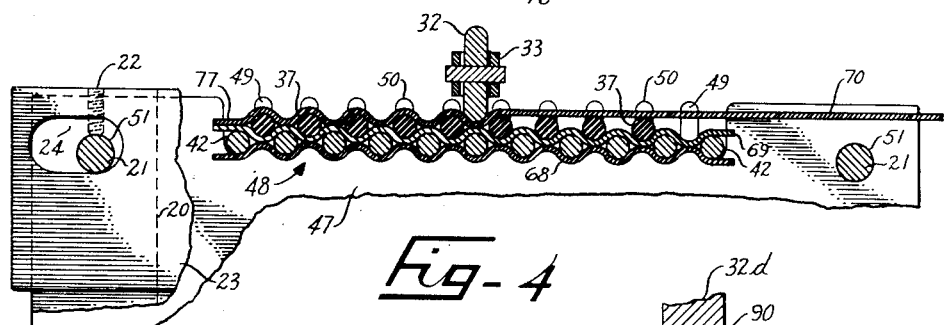
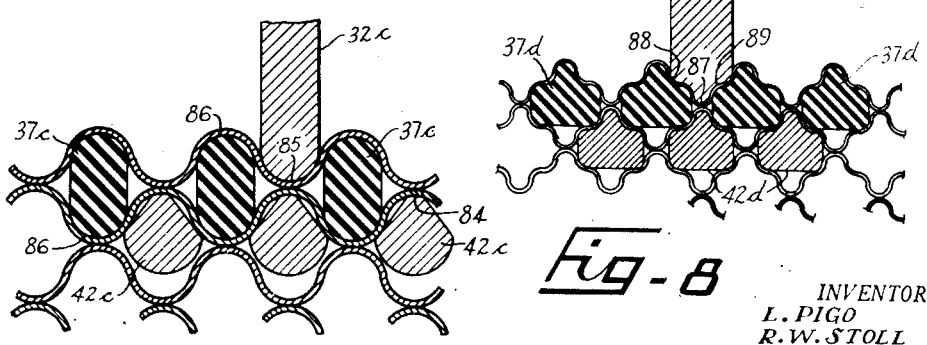
INVENTORS.
L. PIGO
R. W. STOLL
BY
S. Tierney Jr
ATTORNEY United States Patent Office 2,789,203
Patented Apr. 16, 1957

2,789,203

METHOD AND MACHINE FOR MAKING CELLULAR CORE

Lewis Pigo, National City, and Richard W. Stoll, La Mesa, Calif., assignors to Rohr Aircraft Corporation, Chula Vista, Calif., a corporation of California Application October 10, 1955, Serial No. 539,505

19 Claims. (Cl. 219—78)

This invention relates to a machine and method for making honeycomb core by shaping a plurality of thin strips of metal and welding them together at spaced intervals.

An object of the invention is to provide a machine of the above type which is simple and inexpensive to construct.

Another object is to provide such a machine which will make cells of uniform shape and size.

A further object is to provide means whereby forming members of different shapes may be selectively installed quickly to produce cells of several different shapes.

Another object is to provide welding rollers of different shapes for shaping and welding the metal strips.

A still further object is to provide means which can be adjusted to accept metal strips of different widths so that cellular cores of different thickness may be made.

Further objects will become apparent as a description of the machine proceeds. For a better understanding of the invention reference is made to the accompanying drawing, in which:

Fig. 2 is a top view of the machine showing certain parts of the machine retracted after the welding;

Fig. 3 is a sectional view taken on line 3—3 of Fig. 1 showing portions of the machine;

Fig. 4 is a sectional view taken on line 4—4 of Fig. 1 showing portions of the machine and;

Figs. 5 to 8 show on an enlarged scale modified forms of welding rollers and cell supports for forming cores having cells of different shapes.

Figure 1:
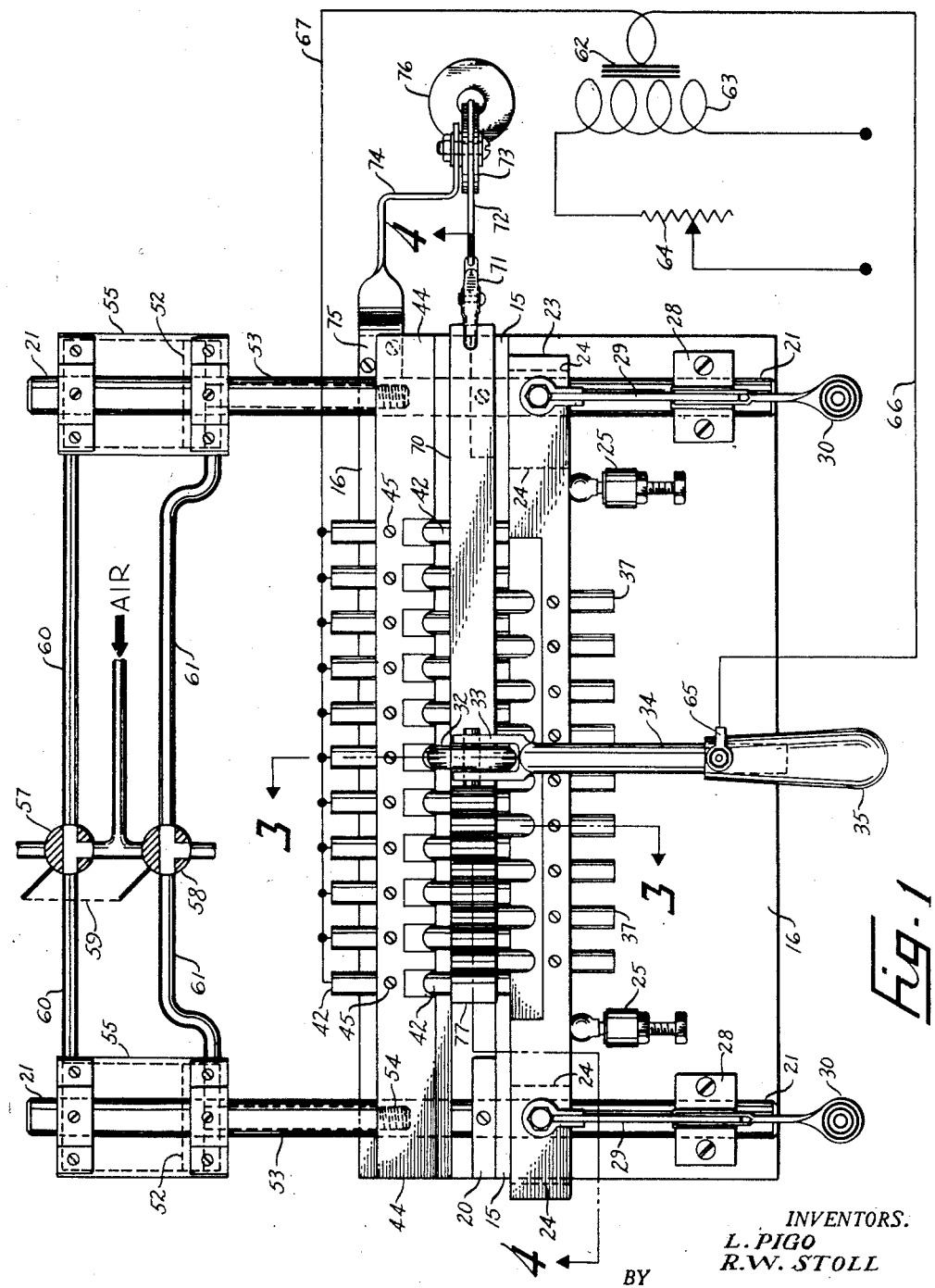
Fig. 1 is a top view, partly diagrammatic, of a machine embodying the invention showing the parts in position for welding.

Referring to Figs. 1, 2 and 3, the machine comprises a long vertical plate 15 attached to a flat base 16 by one or more brackets 17, base 16 having a long straight slot 18 wide enough to pass any cellular core made on the machine. Screws 19 pass through brackets 17 and secure two upright rectangular reinforcing bars 20 against the rear face of plate 15 near its ends. Near their upper ends plate 15 and bars 20 are bored to snugly receive and retain two horizontal cylindrical shafts 21, set screws 22 (Fig. 2) passing through the top of bars 20 bearing against shafts 21 and locking them in place. Slidable along the front end of shafts 21 is a rectangular bar 23 provided with elongated slots 24 of the shape shown in Fig. 4, through which the shafts 21 pass. Adapted to lock bar 23 in a desired positon against the front face of support plate 15 are a pair of clamps 25, each operated by a handle 26 pivoted to clamp support 27 (Fig. 3) which is secured by screws to plate 15. Attached to the front end of each shaft 21 is a bracket 28 which supports a clamp 29 having an operating handle 30. Clamps 25 and 29 may be of any known type and their construction in detail is omitted for the purpose of clarity. The center portion of bar 23 is cut away at its top, thus providing a rearwardly and downwardly inclined face 31 to provide clearance space for the passage of a copper or copper alloy welding roller 32. Roller 32 is pivotally supported in a fork 33 integral with one end of a copper rod 34 to which a handle 35 made of dielectric material is secured.

Bar 23 has a series of equally spaced apart aligned openings 36 shaped to fit a set of rods or pins 37 made of dielectric material such as Bakelite or wood, each pin being adjustable lengthwise in its opening and being locked in position by a set screw 38 passing through a threaded hole in bar 23. The pins 37 shown in Figs. 1 to 4 are of cylindrical shape but pins of other shapes may be used as later described. The top of plate 15 has cut therein a series of notches 39 spaced apart the same as pins 37 and the concave marginal wall 40 of each notch is at the proper level to receive and support the front end 41 of a cylindrical finger 42 made of copper or copper alloy. There are two more notches 39 than pins 37. Fingers or electrodes 42 are slidable in cylindrical holes 43 bored in a long bar 44 or electrode support and each finger is locked in position by a set screw 45 entering a threaded hole in the top of bar 44. The top of bar 44 is cut away over each finger 42 to provide a series of notches 46 to receive the lower portion of roller 32 as it is advanced to effect the welds to be later described. Attached to the front face of bar 44 by means (not shown) is a vertical plate 47 the bottom of which clears base 16, the cellular core 48 as it is formed moving down between the plates 15 and 47 which serve to guide the core and keep it substantially vertical. The top of plate 47 has a set of aligned projecting portions 49 whose upper ends 50 are semi-cylindrical in shape (see Fig. 4), the roller 32 being adapted to pass freely between each pair of adjacent projections 49. Plate 47 and bar 44 have cylindrical bores 51 to receive the shafts 21 and may be moved forwardly or rearwardly along the shafts by a pair of pistons 52 and piston rods 53 whose front ends are screwed into threaded holes 54 in bar 44. Pistons 52 are slidable in a pair of cylinders 55 which may be supported by any suitable means, that illustrated being a pair of clamps 56 which attach each cylinder to its shaft 21. Compressed air from a source (not shown) is supplied to two three-way valves 57, 58 operated by a common control member 59, two tubes 60 leading from valve 57 to the rear ends of the cylinders and two tubes 61 leading from valve 58 to their front ends. Welding current is supplied by a transformer 62 (Fig. 1) whose primary winding 63 has a series variable resistor 64 to control the amplitude of the current flow. One end of the secondary winding is connected to a terminal 65 on rod 34 by flexible wire 66 and the other end of the secondary is connected by flexible wire 67 to the rear ends of all the copper fingers 42. Members 15, 16, 23, 44 and 47 are preferably made of rigid electrical insulating material such as Bakelite, Micarta or other hard organic plastic.

To make core 48 a narrow sheet or strip 68 of any metal capable of being resistance welded, such as aluminum or stainless steel, and having a thickness of from .001 to .005 inch is corrugated to the shape shown in Fig. 4 and laid on the copper fingers 42 with the crests of the corrugations resting on the tops of the fingers which are in their forward position as shown in Fig. 3. With bar 23 clamped in its rearward position as shown in Fig. 3, the pins 37 are between and higher than fingers 42. A second straight strip 69 of metal is laid on top of pins 37 and welded to strip 68 by the operator grasping handle 35 and pressing the roller 32 down between the successive pins while simultaneously moving the roller across the strip to form strip 69 and seam weld it to strip 68 in the manner now to be described in detail in connection with the welding of a third strip 70. After strip 69 is welded to strip 68 to form one set of cells, the operator moves valve control 59 to the position shown in Fig. 2 to admit compressed air to the front ends of cylinders 55 and move pistons 52 and bar 44 back to the position shown in Fig. 2. This causes the fingers 42 to be withdrawn from the cells and leaves the cells supported by the pins 37. The operator now loosens clamps 25 and 29 and moves bar 23 down and to the right until the rear ends of pins 37 are resting on the concave walls 40 of notches 39. Pins 37 are now in alignment with the retracted fingers 42. Valve control 59 is moved to the position shown in Fig. 1 to move pistons 52 and bar 44 forwardly to the position shown in Fig. 1. The front ends 41 of the fingers 42 abut against the rear ends of pins 37 and push the pins out of the cells while the fingers 42 enter them. The pins 37 and their supporting bar 23 are now in their forward position and the fingers 42 are supporting the cells, the front ends 41 of the fingers being now supported by plate 15 as shown in Fig. 3. The operator now moves bar 23 rearwardly and to the right (Fig. 2), simultaneously raising it to position the pins 37 in the corrugations of strip 69 as shown in Fig. 4. The purpose of the slots 24 is to permit this sidewise and up and down movement of pin support bar 23. The operator now tightens clamps 25 and 29 to retain bar 23 in the position shown in Figs. 1 and 3 with the pins 37 pressed firmly against the concavities in strip 69 (see Fig. 4).

To weld a third strip 70 to strip 69, a clamp 71 (Fig. 1) is attached to one end of straight strip 70, the clamp being attached to one end of a flexible wire 72. The wire passes over a pulley 73 which is pivotally supported by an upwardly extending bracket 74 whose base 75 (Fig. 1) is attached to supporting base 16. A weight 76 of size sufficient to set up a substantial tension in strip 70 is attached to the lower end of wire 72. The horizontal reach of wire 72 is preferably slightly below the horizontal plane tangent to the tops of pins 37 so that when the operator pulls the end 77 of the strip past the end finger 42, the strip is under tension and is resting against the tops of pins 37. The rear edge of the strip is abutted against the front of the upstanding projections 49. The operator presses roller 32 down against the center portion of the strip at the left of pin 37, which is at the extreme left (Figs. 1 and 4), thus bending the end of the strip down about the pin and tack welding the center of the end to the end of strip 69. By rolling roller 32 transversely across the strip, a seam weld is made across the strip. The roller is then raised and pressed down against the center of the portion of strip 70 intermediate the two end pins 37 thereby bending the strip down and forming it substantially to the contour of the top portions of these pins. Current simultaneously passes from roller 32 to the copper finger 42 directly under the roller, tack welding the center of strip 70 to strip 69. The roller is now rolled transversely across the strip to complete the forming and to seam weld the depressed portion thereof to the underlying crest of strip 69. The flexing of the strip down between pins 37 causes the right hand end of the strip to be pulled toward the left and raise the weight 76 which continually maintains strip 70 under tension. This process is continued until pin 37 at the extreme right has been reached when the strip 70 is cut off beyond the last weld, the formed strip and strip 69 now making an aligned set of cells of core 48. Fig. 4 shows roller 32 in position after five cells have been formed and with the unwelded portion of strip 70 still straight and under tension. After inserting the copper fingers 42 in the cells formed by strips 69 and 70 in the manner above described, another strip (not shown) may be formed and welded to strip 70 in the manner just described, except that bar 23 is moved up and to the left (Fig. 2) before it is moved rearward to position pins 37 in the corrugations of strip 70. As the core 48 is added to, it moves down between the plates 15 and 47 which act as a guide to keep it vertical. If the strips 68, 69, 70 and others welded thereto are all of the same width, by keeping the rear edge of each strip against the aligned projections 49 as the welding proceeds, a cellular core 48 is formed whose end faces are substantially plane and parallel. If the core is long enough, it passes down through slot 18 in base 16 so an indefinite number of strips may be welded to the core in the manner described by supporting base 16 at a sufficient height above the floor or ground level.

To set the machine for making thicker core using metal strips wider than strips 68, 69 and 70, set screws 45 are loosened and fingers 42 moved forward in the bores 43 a distance equal to increase in core thickness. The set screws 45 are then tightened. Also set screws 38 are loosened and the pins 47 moved rearwardly a distance equal to the increase in core thickness. These adjustments are made while pistons 52 and bar 44 are at their rearward positions (Fig. 2). The set screws 78 which lock the cylinder supporting clamps 56 to shafts 21 are loosened and the clamps and cylinders move rearwardly a distance equal to the increase in core thickness. The set screws 78 are then tightened. When valve control member 59 is now adjusted to move pistons 52 to their forward positions, the front face of plate 47 will be spaced from the rear face of plate 15 by a distance equal to the new core thickness plus a small clearance distance of from .002 to .005 inch to allow the core to slide down between the plates as it is formed.

If a longer core is required, longer bars 23 and 44 may be used and the number of pins 37 and copper fingers 42 may be correspondingly increased to provide for the increased number of cells in each row.

If a core with substantially square cells is desired, the straight pins 37a and straight copper fingers 42a are made with cross sectional shapes shown in Fig. 5. In this case the periphery of welding roller 32a has a shape shown with a central cylindrical portion 79 about .03 inch wide terminating in two frusto-conical portions 80 which are disposed at an angle of 90° apart. The top strip is depressed and shaped as roller 32a passes transversely across it and the narrow portion of the strip directly under cylindrical face 79 is seam welded to the abutting crest of the underlying strip. The several steps necessary to make the cellular core are the same as those above described.

To make a core with hexagonal shaped cells straight copper fingers 42b (Fig. 6) and straight insulation pins 37b are used. In this case welding roller 32b has frusto-conical faces 81 terminating in two cylindrical faces 82 between which is a central cylindrical face 83 raised about .001 inch above faces 82, the amount of this raise in the drawing being exaggerated for clarity. The welding seam is thus effected in the portion of the strips directly under cylindrical face 83 whose width is preferably about .03 inch.

To make a core whose cell walls resemble closely the shape of a sine curve, straight copper fingers 42c and straight insulation pins 37c having cross sectional shapes shown in Fig. 7 may be used. The curved face 84 at the top of each finger 42c is preferably a portion of a circular cylinder whose central axis is at the center of the pin and has a width of about .03 inch. The peripheral face 85 of welding roller 32c has a cross sectional shape of a circular arc and the top and bottom faces 86 of pins 37c are portions of substantially circular cylinders. The seam weld is effected between the contacting regions of the two strips directly above the curved face 84.

To make a core of cells each of whose walls is corrugated, straight copper fingers 42d and straight insulation pins 37d having cross sectional shapes shown in Fig. 8 may be used. In this case welding roller 32d has a convex peripheral face 87 connected to a second convex face 88 by a concave surface 89, face 88 terminating in the plane face 90 at the side of the roller.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. The method of forming a series of interconnected metallic cells which comprises the steps of corrugating a long thin metal sheet; inserting a plurality of metal fingers of high electrical conductivity simultaneously under the crests of the corrugations; advancing a plurality of rods composed of dielectric material simultaneously over and between said fingers; placing a long thin metal strip on top of said rods; pressing a welding electrode against the top of said strip at a point intermediate a first and second of said rods to deform said strip and press a portion of said strip against a crest of said sheet; advancing said welding electrode transversely across said strip while simultaneously passing welding current from said electrode through said strip and sheet to seam weld said strip and sheet together; pressing said welding electrode against the top of said strip at a point intermediate the second and third of said rods to deform said strip and press said strip against the second crest of said sheet; advancing said welding electrode transversely across said strip while simultaneously passing welding current from said electrode through said strip and sheet to seam weld said strip and sheet together; and repeating the aforesaid steps with the welding electrode over the remaining crests of the sheet in succession.

2. The method of forming a cellular core by welding a strip of metal to the crests of a corrugated underlying sheet which comprises the steps of inserting a plurality of metal fingers simultaneously under and in contact with said crests; advancing a plurality of rods composed of dielectric material simultaneously into the spaces between said fingers with the tops of said rods disposed at a substantially higher level than the tops of said fingers; placing the metal strip on the tops of said rods directly over said crests; pressing a metal member having a convexly curved lower face down against the successive portions of said strip which are directly over said fingers in succession to depress said successive portions into contact with said crests; and rolling the lower face of said metal member transversely across said strip while simultaneously passing welding current from said metal member to said fingers in succession.

3. A machine for forming an upper metal strip and seam welding spaced apart portions thereof to the crests of the corrugations of a lower corrugated metal strip disposed under the upper strip, comprising: a plurality of metal fingers under and in contact with said crests; a long rigid support; means for securely attaching said metal fingers to said support to prevent movement of any finger with reference to the other fingers; a plurality of rigid electrical insulators disposed between and above said fingers with the upper strip resting on said insulators; a support bar attached to said electrical insulators; and an electrically energized electrode having a curved face adapted to be pressed down against said upper strip and to be simultaneously moved transversely thereacross directly above each of said fingers to corrugate said upper strip and seam weld the crests thereof to the crests of the corrugations of said lower strip.

4. A forming and welding machine as claimed in claim 3, in which the transverse cross sectional shapes and sizes of said metal fingers and electrical insulators are substantially the same.

5. A forming and welding machine as claimed in claim 3, in which said metal fingers and electrical insulators are substantially square in a sectional plane normal to their longitudinal axes.

6. A forming and welding machine as claimed in claim 3, in which said metal fingers and electrical insulators are substantially hexagonal in a sectional plane normal to their longitudinal axes.

7. A forming and welding machine as claimed in claim 3, in which each of said metal fingers has upwardly converging flat faces whose upper ends are connected by a narrow curved face and each of said electrical insulators has a substantially cylindrical top face.

8. A forming and welding machine as claimed in claim 3, in which supporting means for said bar is provided which permit its movement in any direction.

9. A forming and welding machine as claimed in claim 3, in which said rigid support for the fingers is provided with a pair of spaced apart bores; and a pair of stationary guide shafts pass through said bores, said support being slidable along said guide shafts.

10. A forming and welding machine as claimed in claim 3, in which said rigid support is provided with a plurality of spaced apart openings into which said metal fingers extend and within which they are slidable; and means for locking said fingers to said rigid support.

11. A forming and welding machine as claimed in claim 3, in which said bar is provided with a plurality of spaced apart openings into which said insulators extend and within which they are longitudinally adjustable; and means for locking said insulators to said bar.

12. A machine for seam welding a long corrugated lower metal strip the side walls of whose adjacent corrugations are flat and converge upwardly to spaced apart portions of a long upper metal strip, comprising: a plurality of horizontally aligned spaced apart metal fingers having inclined side walls in contact with the lower faces of said flat side walls; a plurality of horizontally aligned rigid electrical insulators disposed between said fingers, each pair of adjacent insulators having flat inclined sidewalls which diverge upwardly and extend to a level substantially above the tops of said fingers, said upper strip resting on said insulators over the lower strip; and an electrically energized welding roller supported to be pressed down against said spaced apart portions of the upper strip successively and rolled transversely thereacross, said roller having parallel end faces and a peripheral face the center portion of which is cylindrical and the portions of the face adjacent said ends are oppositely inclined conical frustums.

13. A seam welding machine as claimed in claim 12, in which said metal fingers and insulators are of substantially square cross section in a plane normal to their longitudinal axes.

14. A seam welding machine as claimed in claim 12, in which said metal fingers and insulators are of substantially hexagonal cross section in a plane normal to their longitudinal axes.

15. A machine for forming a substantially flat upper metal strip and seam welding spaced apart portions thereof to the crests of the corrugations of a lower corrugated metal strip disposed under the upper strip, comprising: a plurality of long metal fingers under and in contact with said crests, each finger having a pair of upwardly converging flat side faces whose upper ends are connected by a narrow curved face; a common support for said metal fingers; a plurality of rigid electrical insulators disposed between and above said fingers with the upper metal strip resting on said insulators, each of said insulators having substantially parallel sides connected at their top by a convex cylindrical face which is symmetrical about a vertical plane through the longitudinal axis of the insulator; a common support securely attached to said insulators; and an electrically energized electrode having a curved face adapted to be pressed down against said upper strip and to be simultaneously moved transversely thereacross directly above the narrow curved faces of said fingers to corrugate said upper strip and seam weld the crests thereof to the crests of the corrugations of said lower strip.

16. A machine for forming a substantially flat upper metal strip and seam welding spaced apart portions thereof to the crests of the corrugations of a lower metal strip to provide a core of interconnected metal cells, comprising: a plurality of long spaced apart metal fingers having convex top portions in contact with said crests; a plurality of rigid electrical insulators disposed between and above said fingers, each of said insulators having a convex top face on which said upper strip rests, said top face being connected to a side face whose upper portion is concave and merges with a lower portion which is convex; and an electrically energized roller constructed to be pressed against spaced apart regions of said upper strip and to be rolled transversely across said regions, said roller having substantially parallel end walls and a convexly curved central portion which is connected to each of said side walls by a double curved face which is convex adjacent the side wall and concave adjacent said central portion.

17. The method of making a cellular core by welding a strip of metal to the crests of a transversely corrugated metal sheet which comprises the steps of inserting a plurality of metal fingers simultaneously under and in contact with said crests; advancing a plurality of rods composed of dielectric material simultaneously along the upper surface of said sheet into the spaces between said fingers with the tops of said rods disposed at a substantial distance above the tops of said fingers; placing the metal strip on the tops of said rods; pressing a welding electrode against the consecutive portions of the metal strip which are directly over said metal fingers to press said portions consecutively against said crests; moving said electrode transversely across said strip and simultaneously passing welding current from said electrode to said fingers to deform said strip and weld said portions to said crests; withdrawing said metal fingers simultaneously from under said corrugations; moving said rods, sheet and strip sidewise and vertically to axially align said rods and fingers; withdrawing said rods from under said strip and simultaneously advancing said fingers under said strip between said welded portions; moving said rods sidewise and vertically to a position above said strip; and advancing said rods along the upper surface of said strip into the spaces between said fingers with the tops of the rods disposed a substantial distance above the tops of said fingers.

18. A machine for forming an upper metal strip and seam welding spaced apart portions thereof to the crests of a lower corrugated strip disposed under the upper strip to form a core of interconnected cells, comprising: a plurality of metal fingers under and in contact with said crests; a plurality of rigid electrical insulators disposed on the upper surface of said lower strip between and above said fingers with the upper strip resting on the tops of said insulators; an electrically energized welding electrode constructed to be pressed against said upper strip and to be moved transversely thereacross directly over each of said fingers to thereby corrugate said upper strip and weld the crests of the corrugations thus formed to the lower strip; and means for supporting said electrical insulators for simultaneous movement transversely of said strips after the welding to withdraw the insulators from the corrugations of the upper strip.

19. A machine as claimed in claim 18, in which means is provided for supporting said metal fingers for simultaneous movement transversely of said strips in a direction opposite to the movement of said insulators to withdraw said fingers from contact with said lower strip and permit the formed core to be supported by said electrical insulators.

References Cited in the file of this patent
UNITED STATES PATENTS

| | | |
|---|---|---|
| 2,163,590 | Ganahl | June 27, 1939 |
| 2,324,435 | Smith | July 13, 1943 |